Oct. 29, 1968    A. L. BAKER    3,408,146
MICRO-ANGLE GENERATOR
Filed Oct. 24, 1963
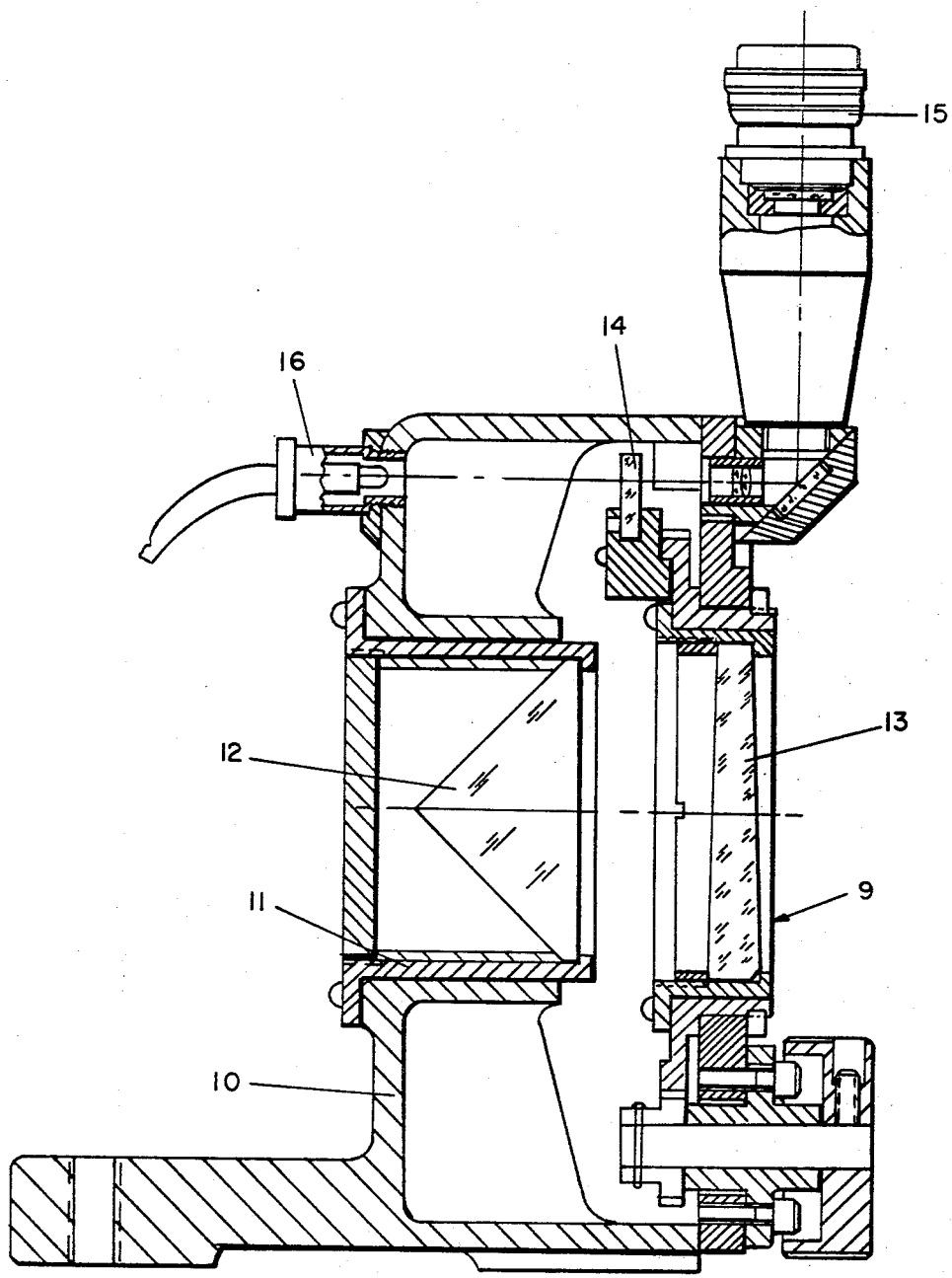
INVENTOR.
ALLISTER L. BAKER
BY *Peter F. Willig*
ATTORNEY

3,408,146
MICRO-ANGLE GENERATOR

Allister L. Baker, Denville, N.J., assignor to Keuffel & Esser Company, Hoboken, N.J., a corporation of New Jersey
Filed Oct. 24, 1963, Ser. No. 318,591
3 Claims. (Cl. 356—140)

ABSTRACT OF THE DISCLOSURE

A device for generating minutely accurate angles is provided by aligning the optical axis of a refracting element with a principal plane of a one-plane retro-reflector. Rotation of the refracting element about its optical axis to a position where the plane of refraction lies at an angle with the principal plane of the retro-reflector generates in a plane perpendicular to the principal plane a minutely accurate angle between a collimated light beam incident upon the refracting element and passing to the retro-reflector, thence to be reflected to the refracting element, and the light beam thereafter emerging from the refracting element.

---

The present invention relates to a system, apparatus, and method for generating angles and refers more particularly to a system, apparatus and method of generating angles accurate to a second of arc or better.

In one known method of generating extremely accurate angles, it was necessary to direct a beam of collimated light to a reflector through a pair of perfectly matched optical wedges in precision mounts for counter-rotation about an axis normal to the reflector. The beam passing to and from the reflector was doubly refracted by the pair of wedges into a path dependent upon the refractive power of the wedges and upon their degree of counter-rotation. Imperfect matching of the wedges led to the imperfect bending of the light beam.

The optical system comprising the reflector and the matched optical wedges suffers from two major disadvantages: (1) the need for precise matching of the optical wedges; and (2) the need for the precision mounts for counter-rotation of the optical wedges. Instruments utilizing this optical system are difficult to manufacture and to maintain in optimum condition for use.

The present invention overcomes these disadvantages by means of an optical system comprising a single refracting deviator optically aligned with a one-plane retro-reflector, such as a Porro prism.

One object of the present invention is to provide an optical system for generating and determining accurate angles.

Another object is to provide an optical system comprising a single refracting deviator aligned with a one-plane retro-reflector for generating and measuring accurate angles.

Another object is to provide an apparatus for generating and determining accurate angles by means of an optical wedge aligned with a Porro prism.

Another object is to provide a method for generating and determining accurate angles.

Other objects will become apparent during the course of the specification.

The objects may be realized by directing a beam of collimated light into an optical system of the present invention and by accurately adjusting the system so that the reflected beam forms an accurate angle with the incident beam.

The system comprises a single refracting deviator optically aligned and rotatably mounted with respect to a one-plane retro-reflector. The reflector is defined as an optical element which reflects a beam of light parallel to the incident beam when the incident beam is in a principal plane of the one-plane retro-reflector. For a reflector such as a Porro prism, a principal plane is defined as one of those parallel planes normal to all three faces of the prism. When the incident beam is inclined to a particular principal plane, the reflected beam is also inclined to the same principal plane by an equal amount in the opposite direction. For purposes of this disclosure, the incident beam lies in a particular principal plane.

The deviator is designed to produce accurate reflections of a beam in seconds of arc as a function of rotation about an axis lying in a principal plane of a one-plane retro-reflector. Accurate refractions are accomplished by rotation of the deviator from a position producing zero refraction in a plane perpendicular to the principal plane of the associated one-plane retro-reflector to a new position producing the desired refraction in the same perpendicular plane. Thus when the principal plane of the one-plane retro-reflector is vertically disposed, the beam angle generated by rotation of the deviator is in a horizontal plane.

When the principal plane of the one-plane retro-reflector is vertically disposed and the refracting deviator produces no horizontal refraction of an incident light beam, the beam lying in a particular principal plane passes through the deviator to the retro-reflector from which it is reflected in a beam parallel to the incident beam. Rotation of the deviator about its axis produces a refraction of the beam with a horizontal component dependent upon the refractive power and the degree of rotation of the deviator. Thus, with a deviator which produces refractions in seconds of arc, extremely small angles with accuracies to a tenth of a second of arc can be generated.

In the drawing, FIGURE 1 is a side-elevation view of one embodiment of the present invention.

The embodiment of FIGURE 1 is a miro-angle generator 9 which comprises a support 10 having an opening 11 within which is mounted a one-plane retro-reflector such as a Porro prism 12 with its principal planes vertically disposed. The Porro prism 12 is optically aligned with a refracting deviator such as an optical wedge 13 rotatably mounted on the support 10 with its axis of rotation lying in a principal plane of the Porro prism 12. A calibrated scale 14 is attached to the wedge 13 as indicated in FIGURE 1 with the indicator (not shown) attached to the support 10. The calibrated scale 14 indicates the angle produced by a refracted beam of collimated light with the incident beam in a horizontal plane due to the rotation of the optical wedge 13.

In one use, the micro-angle generator 9 is set on a surface with the optical wedge 13 set in its zero refraction position. A beam of collimated light is then aligned with the generator 9. The wedge 13 is then rotated to accurately refract the beam to and from the retro-reflector 12 so that the reflected beam passing through the wedge 13 defines an accurate angle with the incident beam. Thus, an accurate angle is generated between the incident beam and the reflected beam. This accurate angle may be used for testing purposes or for reference purposes.

In another use, the micro-angle generator 9 is set on a precision indexing table comprising a pair of ground and lapped serrated master plates that mate for positive locking by means of the serrations. The number of serrations determines the degree interval of the indexing table. For 360 serrations, settings to the nearest degree may be generated. For 1,440 serrations, settings to the nearest quarter-degree may be generated. In the more precise indexing tables, accuracies of one-fourth second of arc are obtainable.

A first beam of collimated light is aligned with the generator 9 in its zero refraction position and with the indexing table in a zero rotation position so that the beam forms one leg of an angle. The table is then rotated to a new position and set with the plates meshed. The angle generated is measured in degrees, half-degrees or quarter-degrees, depending upon the number of serrations.

A second beam of collimated light is aligned with the generator 9 on the reset table. Then the optical wedge 13 of the generator 9 is rotated from its zero refraction position to the desired refracting position to generate an accurate angle which is algebraically added to the relatively coarse setting of the indexing table. Since the accuracy of the indexing table and the generator are of the same order of magnitude, that is, tenths of a second of arc, large angles with an accuracy of tenth of a second of arc may be generated between the first incident beam and the second reflected beam.

It is obvious that the accurate angles may be generated in planes other than the horizontal by means of the present invention.

The support may be any stable base having a projecting member with an opening therein for mounting a one-plane retro-reflector.

The one-plane retro-reflector is preferably a Porro prism having 45°–45°–90° angles and internally reflective surfaces on the smaller faces. An incident beam passes through the largest face and is internally reflected at each shorter face before it emerges at the largest face. Where the incident beam and the reflected beam are in the same principal plane, the beams are parallel but are traveling in opposite directions.

The refracting deviator is preferably a wedge rotatably mounted with respect to a mounted Porro prism in a support. The deviator may comprise two or more components for correction of aberration; that is it can be achromatic.

The calibrated scale is accurately correlated with the refractive power of the deviator to indicate the angle of refraction due to the rotation of the deviator with respect to the one-plane retro-reflector. The magnitude of the scale is an indication of the refractive power of the deviator.

The micro-angle generator 9 may include viewing means mounted on a support for reading the scale 14. The viewing means includes a microscope 15 and a light source 16 mounted on the support 10. Back-lighting of a transparent scale may be used.

It is apparent that the present invention is capable of many variations and modifications. All such variations and modifications are to be included within the scope of the present invention.

What is claimed is:
1. An optical angle generator comprising:
(a) a one-plane retro-reflector;
(b) an optical refracting wedge deviator mounted in optical alignment with said retro-reflector for rotation about an axis lying in a principal plane of deviation of said deviator and in a principal plane of said retro-reflector, and perpendicular to the entrance face of said retro-reflector whereby a light beam proceeding from said deviator is returned to said deviator by said retro-reflector;
(c) means for rotating said deviator about said axis; and
(d) scaling means associated with said deviator for determining the amount of rotation of said deviator, thereby providing a measure of the degree of angle generation resulting from a rotation of said deviator.

2. An optical angle generator comprising:
(a) a body mounting a one-plane retro-reflector;
(b) means on said body mounting an optical wedge deviator for rotation in a plane perpendicular to a principal plane of deviation of said wedge, the axis of rotation of said wedge being disposed normal to the entrance face of said retro-reflector, said retro-reflector and wedge being disposed in optical alignment whereby a light beam proceeding from said deviator is returned to said deviator by said retro-reflector; and
(c) calibrated means mounted on said body for movement in association with said rotation, thereby indicating the degree of angle generation.

3. An optical angle generator comprising:
(a) a body having a cavity therein and an opening communicating said cavity to the outer environs of said body;
(b) a one-plane retro-reflector prism mounted in said cavity with the prism entrance face disposed in the direction of said opening;
(c) an optical wedge deviator mounted in said opening in optical alignment with said retro-reflector for rotation in a plane perpendicular to a principal plane of deviation of said wedge and about an axis disposed perpendicular to said prism entrance face whereby a light beam proceeding from said deviator is returned to said deviator by said retro-reflector; and
(d) calibrated means mounted for movement in association with said rotation, thereby indicating the degree of angle generation.

References Cited

UNITED STATES PATENTS

| | | | |
|---|---|---|---|
| 2,880,644 | 4/1959 | Brockway et al. | 141 |
| 3,114,842 | 12/1963 | Davidson | 250—234 |

JEWELL H. PEDERSEN, *Primary Examiner.*

A. A. KASHINSKI, *Assistant Examiner.*